UNITED STATES PATENT OFFICE.

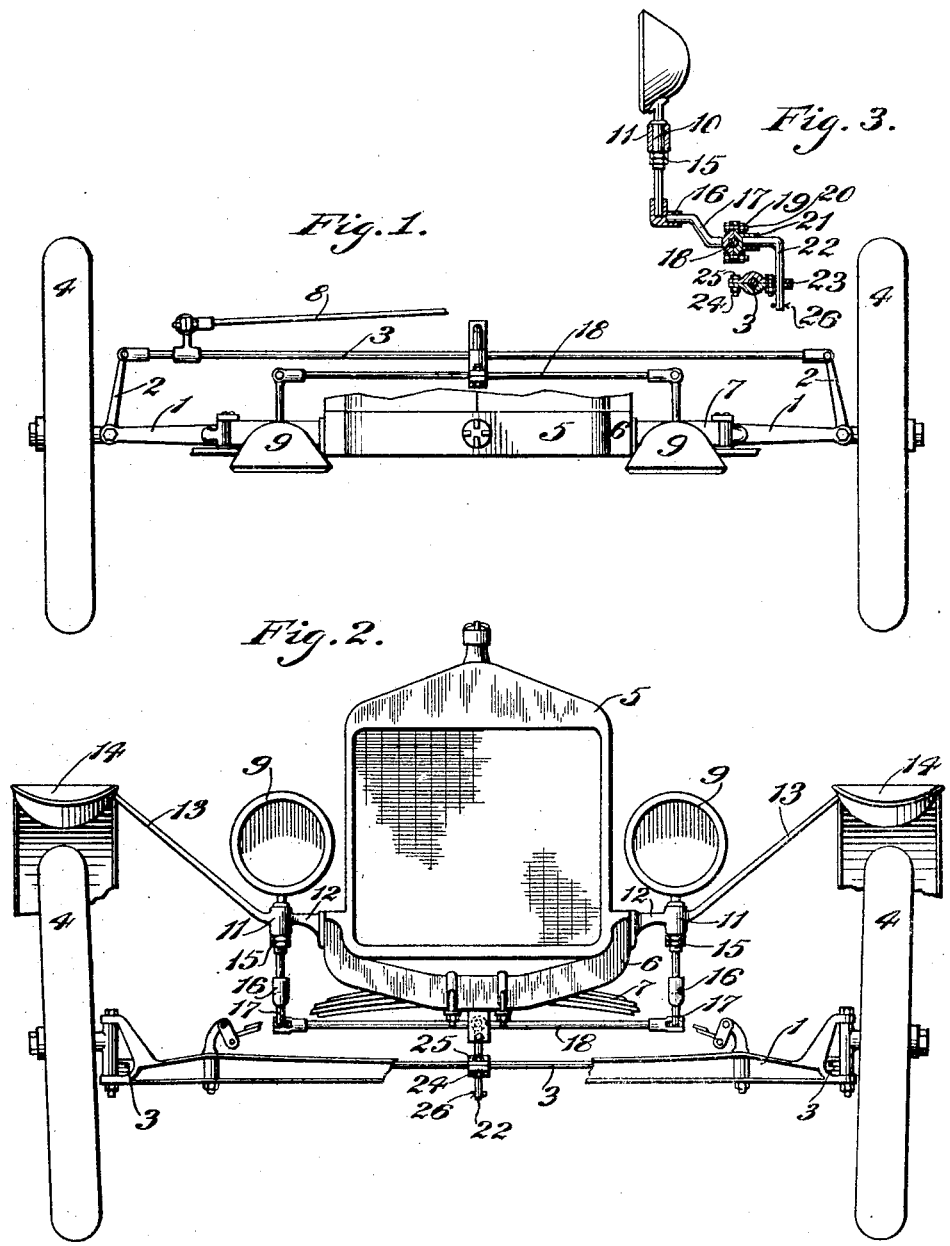

HARVEY H. HOY, OF ST. LOUIS, MISSOURI.

SELF-ADJUSTING HEADLIGHT FOR AUTOMOBILES.

1,242,350.  Specification of Letters Patent.  Patented Oct. 9, 1917.

Application filed April 9, 1917.  Serial No. 160,667.

*To all whom it may concern:*

Be it known that I, HARVEY H. HOY, a citizen of the United States, and resident of St. Louis, Missouri, have invented certain new and useful Improvements in Self-Adjusting Headlights for Automobiles, of which the following is a specification containing a full, clear, and exact description, reference being had to the accompanying drawings, forming a part hereof.

My invention relates to an improved lamp supporting and operating means for automobiles, and it consists in the novel construction and arrangement of parts hereinafter described and particularly pointed out in the claim found at the end of this specification.

The object of my invention is to provide an improved mechanism for automatically turning the lamps or headlights of automobiles whenever the steering-wheel is turned; for the purpose of enabling the driver to clearly see the road at all times when driving at night, and particularly when approaching (or driving upon) a curve in the road.

In the drawing,

Figure 1 is a plan view of the front portion of an automobile having my invention applied thereto.

Fig. 2 is a front-end elevation of an automobile having my invention applied thereto, and Fig. 3 is a detail sectional side-elevation of a lamp or headlight and its immediate connections.

Referring again to the drawing the numeral 1 designates the usual front axle of an automobile, having the steering-arms 2 which are pivotally connected by the horizontal steering-gear rod 3.

4 designates the tires of the front wheels; 5 the radiator of the engine; 6 the chassis or frame; 7 the spring which supports the front end of the chassis; and 8 the usual rod which extends to the steering-post.

The numeral 9 designates the lamps or headlights, which are provided upon their undersides with vertical journals 10 mounted to rotate or rock in bearings 11 of brackets 12 fixed to the chassis or frame 6, the said brackets having integral fender-arms 13 extending outwardly, and upon which the front fenders 14 are supported.

Beneath the bearings 11 common locknuts 15 are mounted upon the said journals of the lamps, to prevent vertical movement of said journals in said bearings 11.

The said lamp-journals 10 are extended downwardly a distance, and have fixed upon their lower ends L-shaped sockets 16, the horizontal arm of which has fixed in it a rearwardly-extending crank-arm 17, the rear end of the latter being pivotally connected to a horizontal connecting-rod 18.

Said connecting-rod 18 extends parallel with the said steering gear rod 3, and pivotally connects the crank-arms 17 of the two lamps 9, so that whenever one of said lamps is rotated the other lamp will be rotated a like distance in the same direction.

A clamp 19 is fixed upon said connecting-rod 18 at about the center of the length of the latter, by means of suitable bolts 20, and said clamp is formed with a socket 21 which projects rearwardly from said clamp.

Fixed within said socket 21 is the horizontal arm of an L-shaped lamp-turning bar 22, the vertical arm of which is mounted to slide in a bearing 23 formed integral with another clamp 24 that is fixed by means of bolts 25 upon the said steering-gear rod 3, at the center of the length of the latter, so that whenever the steering-gear rod is moved by its steering-post rod 8 the said lamp-turning bar and the lamp-connecting rod 18, as well as the lamps 9, will be turned at the same time.

A common split-pin or cotter 26 is passed through a perforation in the said vertical arm of said lamp-turning bar 22, at a point below the said bearing 23, to prevent said arm from passing out of said bearing accidentally when subjected to any undue strain during the operation of the automobile upon rough roads.

From the above description of my invention the operation of the same will be clear to those skilled in the art, and further explanation is deemed unnecessary, except to say that the vertical arm of the said lamp-turning bar 22 moves freely up and down in its bearing 23 as the chassis of the automobile moves upon the springs which support it; so that there is a positive connection, at all times, between the steering gear rod 3 and the lamps 9, thereby insuring their being turned in the proper direction to throw the light from the lamps upon the road at all times, no matter if the road be straight or curved.

What I claim as my invention is the following:

An improved mechanism for causing the headlights of an automobile to be positively turned whenever the steering-gear thereof is turned to alter the direction of the automobile; consisting of lamps each having a vertical journal; brackets having bearings in which said journals are mounted, said brackets being fixed to some part of the automobile; crank-arms at the lower ends of said journals; a horizontal rod to which said crank-arms are pivotally-connected; a socket fixed upon said horizontal rod; an L-shaped lamp-turning bar having its horizontal arm fixed in said socket; the steering-rod of an automobile; and a bearing fixed upon said steering-rod so that the vertical arm of said lamp-turning bar may slide within said bearing last mentioned as the chassis of the automobile moves up and down upon its springs.

In testimony whereof, I have signed my name to this specification, in presence of two subscribing witnesses.

HARVEY H. HOY.

Witnesses:
  HENRY L. HIGDON,
  JOHN C. HIGDON.